(12) United States Patent
Zhang et al.

(10) Patent No.: US 11,270,139 B2
(45) Date of Patent: Mar. 8, 2022

(54) APPARATUS AND METHOD FOR TRAINING CLASSIFYING MODEL

(71) Applicant: FUJITSU LIMITED, Kawasaki (JP)

(72) Inventors: Meng Zhang, Beijing (CN); Rujie Liu, Beijing (CN)

(73) Assignee: FUJITSU LIMITED, Kawasaki (JP)

(*) Notice: Subject to any disclaimer, the term of this patent is extended or adjusted under 35 U.S.C. 154(b) by 15 days.

(21) Appl. No.: 16/737,370

(22) Filed: Jan. 8, 2020

(65) Prior Publication Data

US 2020/0234068 A1 Jul. 23, 2020

(30) Foreign Application Priority Data

Jan. 18, 2019 (CN) .......................... 201910105993.1

(51) Int. Cl.
*G06K 9/00* (2006.01)
*G06K 9/62* (2006.01)

(52) U.S. Cl.
CPC ..... *G06K 9/00892* (2013.01); *G06K 9/00248* (2013.01); *G06K 9/00288* (2013.01); *G06K 9/00369* (2013.01); *G06K 9/6257* (2013.01); *G06K 9/6265* (2013.01); *G06K 9/6277* (2013.01)

(58) Field of Classification Search
None
See application file for complete search history.

(56) References Cited

U.S. PATENT DOCUMENTS

2018/0129869 A1* 5/2018 Yu .............................. G06N 3/08
2019/0213408 A1* 7/2019 Cali .................... G06K 9/00456

FOREIGN PATENT DOCUMENTS

CN 108491824 A 9/2018

OTHER PUBLICATIONS

Hinton, Geoffrey, Oriol Vinyals, and Jeff Dean. "Distilling the knowledge in a neural network." arXiv preprint arXiv:1503.02531 (2015). (Year: 2018).*
Extended Search Report dated Jun. 4, 2020, issued in counterpart EP Application No. 20151193.8 (10 pages).

(Continued)

*Primary Examiner* — David Perlman
(74) *Attorney, Agent, or Firm* — Westerman, Hattori, Daniels & Adrian, LLP (57) ABSTRACT

An apparatus for training a classifying model comprises: a first obtaining unit configured to input a sample image to a first machine learning framework, to obtain a first classification probability and a first classification loss; a second obtaining unit configured to input a second image to a second machine learning framework, to obtain a second classification probability and a second classification loss, the two machine learning frameworks having identical structures and sharing identical parameters; a similarity loss calculating unit configured to calculate a similarity loss related to a similarity between the first classification probability and the second classification probability; a total loss calculating unit configured to calculate the sum of the similarity loss, the first classification loss and the second classification loss, as a total loss; and a training unit configured to adjust parameters of the two machine learning frameworks to obtain a trained classifying model.

20 Claims, 4 Drawing Sheets

(56) References Cited

OTHER PUBLICATIONS

Dubey, Abhimanyu et al., "Pairwise Confusion for Fine-Grained Visual Classification", International Conference on Financial Cryptography and Data Security, pp. 71-88; Cited in EESR dated Jun. 4, 2020.

Qiu, Fan et al., "Deep Face Recognition Under Eyeglass and Scale Variation Using Extended Siamese Network", 2017 4th IAPR Asian Conference on Pattern Recognition, Nov. 26, 2017, pp. 471-476; Cited in EESR dated Jun. 4, 2020.

Zhang. Ligang et al., "Facial Expression Analysis under Partial Occlusion: A Survey", ARXIV. org, Cornell University Library, Feb. 24, 2018, pp. 1-36; Cited in EESR dated Jun. 4, 2020.

Chopra, Sumit et al., "Learning a Similarity Metric Discriminatively, with Application to Face Verification", IEEE Computer Society Conference on Computer Vision and Pattern Recognition, Jan. 1, 2005, pp. 539-546; Cited in EESR dated Jun. 4, 2020.

Zhao et al., "Pose-invariant Face Recognition with Two-Pathway Convolutional Neural Network," Journal of East China University of Science and Technology (Natural Science Edition), Jun. 12, 2018, with English abstract and machine translation (16 pages total).

* cited by examiner

| S302 | Input each sample image in training set to first machine learning framework, to obtain first classification probability and first classification loss of sample image |

| S304 | Input second image of entity to which sample image belongs to second machine learning framework, to obtain second classification probability and second classification loss of second image |

| S306 | Calculate similarity loss related to similarity between first classification probability and second classification probability |

| S308 | Calculate, for all sample images in training set, the sum of similarity loss, first classification loss and second classification loss obtained through calculation with respect to each sample image, as total loss |

| S310 | Adjust parameters of first machine learning framework and second machine learning framework in a manner of optimizing total loss, to obtain trained classifying model |

APPARATUS AND METHOD FOR TRAINING CLASSIFYING MODEL

CROSS-REFERENCE TO RELATED APPLICATIONS

This application claims the priority benefit of Chinese Patent Application No. 201910105993.1, filed on Jan. 18, 2019 in the China National Intellectual Property Administration, the disclosure of which is incorporated herein in its entirety by reference.

FIELD OF THE INVENTION

The present disclosure relates to the field of computer vision and image recognition, and particularly to an apparatus and method for training a classifying model, as well as an apparatus and method for performing classification by using a trained classifying model obtained by an apparatus for training a classifying model.

BACKGROUND

In recent years, thanks to the collection of large-scale image data and the application of machine learning networks, image recognition has gained great development and been widely applied in both academia and industry. However, upon occurrence of an image being occluded or in a different posture, image fuzzy, low resolution and poor image quality in an application scenario, the image recognition performance will be significantly lowered. For example, in a case where an image is a human face image, upon occurrence of a human face being occluded, a human face posture being changed greatly, human face fuzzy, low resolution and poor quality, the human face recognition performance will be significantly lowered.

SUMMARY OF THE INVENTION

A brief summary of the present disclosure is given below to provide a basic understanding of some aspects of the present disclosure. It should be understood that the summary is not an exhaustive summary of the present disclosure. It does not intend to define a key or important part of the present disclosure, nor does it intend to limit the scope of the present disclosure. The object of the summary is only to briefly present some concepts, which serves as a preamble of the detailed description that follows.

In view of the above problem, an object of the present invention is to provide an apparatus and method for training a classifying model, as well as an apparatus and method for performing classification by using a trained classifying model obtained by an apparatus for training a classifying model, which are capable of solving one or more drawbacks in the prior art.

According to an aspect of the present disclosure, there is provided an apparatus for training a classifying model, comprising: a first obtaining unit configured to input each sample image in a training set to a first machine learning framework, to obtain a first classification probability and a first classification loss of the sample image; a second obtaining unit configured to input a second image of an entity to which the sample image belongs to a second machine learning framework, to obtain a second classification probability and a second classification loss of the second image, wherein the first machine learning framework and the second machine learning framework have identical structures and share identical parameters; a similarity loss calculating unit configured to calculate a similarity loss related to a similarity between the first classification probability and the second classification probability; a total loss calculating unit configured to calculate, for all sample images in the training set, the sum of the similarity loss, the first classification loss and the second classification loss obtained through calculation with respect to each sample image, as a total loss; and a training unit configured to adjust parameters of the first machine learning framework and the second machine learning framework in a manner of optimizing the total loss, to obtain a trained classifying model.

According to another aspect of the present disclosure, there is provided a method for training a classifying model, comprising: a first obtaining step of inputting each sample image in a training set to a first machine learning framework, to obtain a first classification probability and a first classification loss of the sample image; a second obtaining step of inputting a second image of an entity to which the sample image belongs to a second machine learning framework, to obtain a second classification probability and a second classification loss of the second image, wherein the first machine learning framework and the second machine learning framework have identical structures and share identical parameters; a similarity loss calculating step of calculating a similarity loss related to a similarity between the first classification probability and the second classification probability; a total loss calculating step of calculating, for all sample images in the training set, the sum of the similarity loss, the first classification loss and the second classification loss obtained through calculation with respect to each sample image, as a total loss; and a training step of adjusting parameters of the first machine learning framework and the second machine learning framework in a manner of optimizing the total loss, to obtain a trained classifying model.

According to another aspect of the present disclosure, there is provided an apparatus for performing classification by using the trained classifying model obtained by the above-mentioned apparatus for training a classifying model, comprising: a classifying unit configured to classify images to be classified by inputting the images to be classified to the first machine learning framework or the second machine learning framework.

According to other aspects of the present disclosure, there is further provided a computer program code and a computer program product for implementing the above-mentioned method according to the present disclosure.

Other aspects of embodiments of the present disclosure are given in the following specification part, wherein preferred embodiments for sufficiently disclosing embodiments of the present disclosure are described in detail, without applying limitations thereto.

BRIEF DESCRIPTION OF THE DRAWINGS

The present disclosure may be better understood with reference to the description given in conjunction with the drawings hereinafter. The same or similar components are denoted with the same or similar reference signs throughout the drawings. The drawings, together with the detailed description below, are incorporated in the specification and form a part of the specification, for further illustrating preferred embodiments of the present disclosure and explaining the principle and advantages of the present disclosure. In the drawings.

DETAILED DESCRIPTION OF THE INVENTION

Hereinafter, exemplary embodiments of the present disclosure will be described combined with the drawings. For the sake of clarity and conciseness, the specification does not describe all features of actual embodiments. However, it should be understood that in developing any such actual embodiment, many decisions specific to the embodiments must be made, so as to achieve specific objects of a developer; for example, those limitation conditions related to system and services are met, and these limitation conditions possibly will vary as embodiments are different. Further, it should also be appreciated that although developing tasks are possibly complicated and time-consuming, such developing tasks are only routine tasks for those skilled in the art benefiting from the contents of the present disclosure.

It should also be noted herein that, to avoid the present disclosure from being obscured due to unnecessary details, only those device structures and/or processing steps closely related to the solution according to the present disclosure are shown in the drawings, while omitting other details not closely related to the present disclosure.

Embodiments according to the present disclosure will be described in detail combined with the drawings below.

Figure 1:
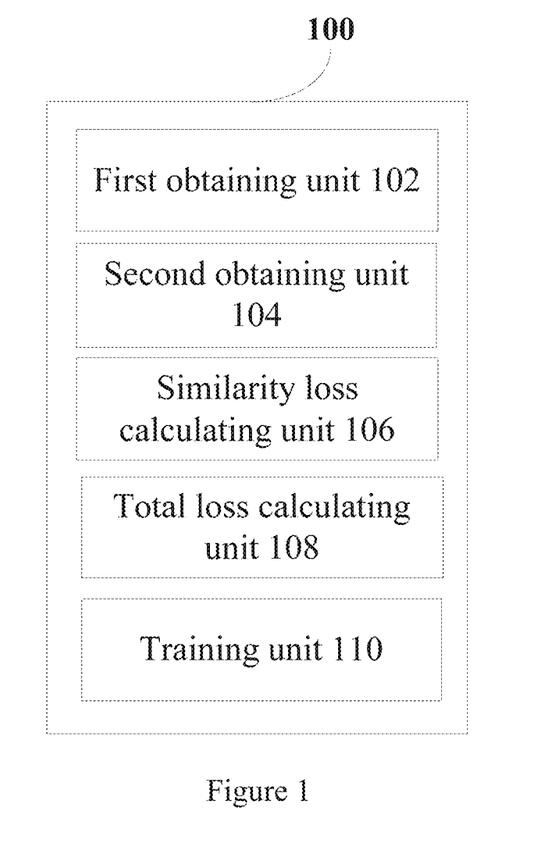
FIG. 1 is a block diagram showing a functional configuration example of an apparatus 100 for training a classifying model according to an embodiment of the present disclosure.

Firstly, a functional block diagram of an apparatus 100 for training a classifying model according to an embodiment of the present disclosure will be described with reference to FIG. 1. FIG. 1 is a block diagram showing a functional configuration example of the apparatus 100 for training a classifying model according to the embodiment of the present disclosure. As shown in FIG. 1, the apparatus 100 for training a classifying model according to the embodiment of the present disclosure comprises a first obtaining unit 102, a second obtaining unit 104, a similarity loss calculating unit 106, a total loss calculating unit 108, and a training unit 110.

The first obtaining unit 102 can be configured to input each sample image in a training set to a first machine learning framework, to obtain a first classification probability and a first classification loss of the sample image.

Specifically, the first obtaining unit 102 inputs each sample image in a training set to a first machine learning framework, to obtain a feature of each sample image. Then, the first obtaining unit 102 calculates a first classification probability and a first classification loss of the sample image based on the feature of the sample image.

As an example, the first machine learning framework may comprise a first classification probability calculation layer, which is used for calculating the first classification probability of the sample image based on the feature of the sample image.

As an example but not a limitation, the first machine learning framework may be a neural network framework. Those skilled in the art can understand that, the first machine learning framework may be a framework other than the neural network framework, which will not be repeatedly described herein.

Figure 2:
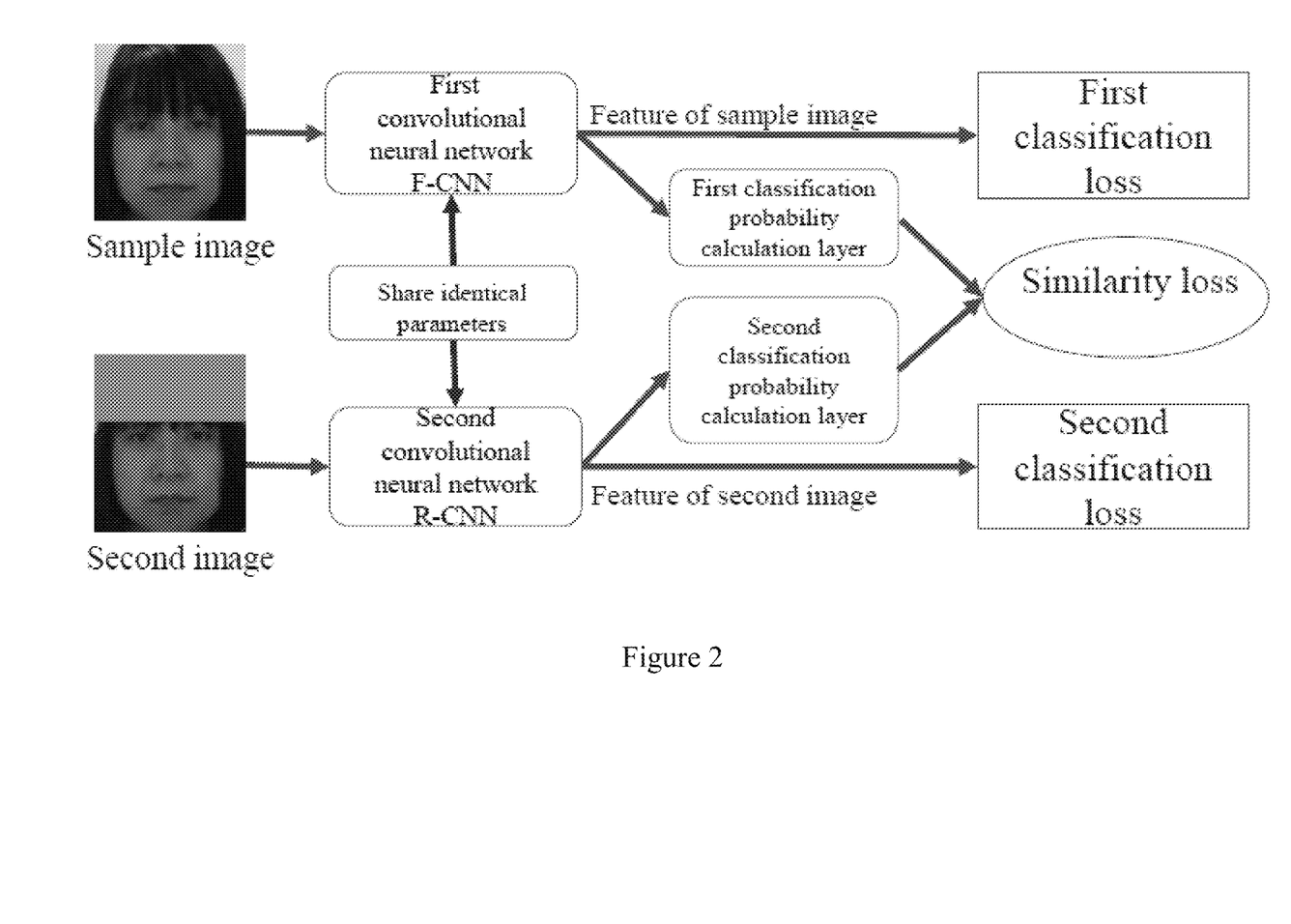
FIG. 2 is a schematic view showing an exemplary implementation of the apparatus 100 for training a classifying model according to an embodiment of the present disclosure.

FIG. 2 is a schematic view showing an exemplary implementation of the apparatus 100 for training a classifying model according to an embodiment of the present disclosure. In FIG. 2, for the sake of convenience, description is made by taking the first machine learning framework being a first convolutional neural network F-CNN as an example.

As shown in FIG. 2, a sample image is inputted to the first convolutional neural network F-CNN, to obtain a feature of the sample image.

As an example but not a limitation, the first convolutional neural network F-CNN may comprise a convolutional layer and a full-connect layer. The first convolutional neural network F-CNN may further comprise a first classification probability calculation layer, which is used for obtaining a first classification probability of the sample image. Although the first classification probability calculation layer is included in the first convolutional neural network F-CNN, for the sake of clarity, in FIG. 2, the first classification probability calculation layer is separately shown downstream of the first convolutional neural network F-CNN. As an example but not a limitation, the first classification probability calculation layer can calculate a first classification probability with a softmax function based on a feature of an image. Those skilled in the art can envisage other implementations of the first classification probability calculation layer, which will not be repeatedly described herein. Hereinafter, description will be made by taking the first classification probability calculation layer calculating a first classification probability with a softmax function as an example. Let an output value of the first classification probability calculation layer of the first convolutional neural network F-CNN, i.e., a first classification probability $P_F$, be represented as follows:

$$P_F = \text{soft max}(\alpha_F) \qquad (1)$$

In the equation (1), $\alpha_F$ is a vector inputted to the first classification probability calculation layer of the first convolutional neural network F-CNN; if the first convolutional neural network F-CNN is a single-network structure, $\alpha_F$ is an output vector (a feature vector of the sample image, as an example but not a limitation) of an upper layer of the first classification probability calculation layer in the first convolutional neural network F-CNN, and if the first convolutional neural network F-CNN is a multi-network structure, $\alpha_F$ is obtained by calculating an arithmetical average or a geometric average of an output vector of an upper layer of a first classification probability calculation layer in each network of a plurality of networks.

Further, as shown in FIG. 2, it is possible to calculate a first classification loss of the sample image using the feature of the sample image.

As an example, it is possible to calculate the first classification loss of the sample image with a softmax loss function. Further, those skilled in the art can also envisage other manners to calculate the first classification loss of the sample image, which will not be repeatedly described herein.

The second obtaining unit 104 can be configured to input a second image of an entity to which the sample image belongs to a second machine learning framework, to obtain a second classification probability and a second classification loss of the second image, wherein the first machine learning framework and the second machine learning framework have identical structures and share identical parameters.

As examples, in a case where the sample image is a vehicle license plate image, an entity to which the sample image belongs is a vehicle license plate, and accordingly, a second image of the entity to which the sample image belongs is also an image of the vehicle license plate, that is, the sample image and the second image are images of the same vehicle license plate; in a case where the sample image is a human face image, an entity to which the sample image belongs is a human face, and accordingly, a second image of the entity to which the sample image belongs is also an image of the human face, that is, the sample image and the second image are images of the same human face; in a case where the sample image is a character image, an entity to which the sample image belongs is a character, and accordingly, a second image of the entity to which the sample image belongs is also an image of the character, that is, the sample image and the second image are images of the same character; those skilled in the art can also envisage other examples of the sample image and the second image corresponding thereto, which will not be repeatedly described herein.

As an example but not a limitation, the second image may be an image generated after the sample image corresponding thereto is partially obstructed, the second image may be an image in a different posture as compared with the sample image corresponding thereto, the second image may be a fuzzy image of the sample image corresponding thereto, and the second image may be an image with lower resolution or worse image quality as compared with the sample image corresponding thereto.

Specifically, the second obtaining unit 104 inputs a second image of an entity to which the sample image inputted to the first machine learning framework belongs to a second machine learning framework, to obtain a feature of the second image. Then, the second obtaining unit 104 calculates a second classification probability and a second classification loss of the second image based on the feature of the second image.

As an example, the second machine learning framework may comprise a second classification probability calculation layer, which is used for calculating the second classification probability of the second image based on the feature of the second image.

As an example but not a limitation, the second machine learning framework may be a neural network framework. Those skilled in the art can understand that, the second machine learning framework may be a framework other than the neural network framework, which will not be repeatedly described herein.

Since in FIG. 2 the description is made by taking the first machine learning framework being a convolutional neural network as an example and the first machine learning framework and the second machine learning framework have identical structures and share identical parameters, in FIG. 2 the second machine learning framework is also a convolutional neural network. Specifically, in FIG. 2, the second machine learning framework is a second convolutional neural network R-CNN. The second convolutional neural network R-CNN and the first convolutional neural network F-CNN comprise identical network layers and share identical network parameters.

As shown in FIG. 2, a second image corresponding to the sample image is inputted to the second convolutional neural network R-CNN, to obtain a feature of the second image.

As an example but not a limitation, the second convolutional neural network R-CNN may comprise a convolutional layer and a full-connect layer. The second convolutional neural network R-CNN may further comprise a second classification probability calculation layer, which is used for obtaining a second classification probability of the second image. Although the second classification probability calculation layer is included in the second convolutional neural network R-CNN, for the sake of clarity, in FIG. 2, the second classification probability calculation layer is separately shown downstream of the second convolutional neural network R-CNN. As an example but not a limitation, the second classification probability calculation layer can calculate a second classification probability with a softmax function based on a feature of an image. Those skilled in the art can envisage other implementations of the second classification probability calculation layer, which will not be repeatedly described herein. Hereinafter, description will be made by taking the second classification probability calculation layer calculating a second classification probability with a softmax function as an example. Let an output value of the second classification probability calculation layer of the second convolutional neural network R-CNN, i.e., a second classification probability $P_R$, be represented as follows:

$$P_R = \text{soft max}(\alpha_R) \qquad (2)$$

In the equation (2), $\alpha_R$ is a vector inputted to the second classification probability calculation layer of the second convolutional neural network R-CNN; if the second convolutional neural network R-CNN is a single-network structure, $\alpha_R$ is an output vector (a feature vector of the sample image, as an example but not a limitation) of an upper layer of the second classification probability calculation layer in the second convolutional neural network R-CNN, and if the second convolutional neural network R-CNN is a multi-network structure, $\alpha_R$ is obtained by calculating an arithmetical average or a geometric average of an output vector of an upper layer of a second classification probability calculation layer in each network of a plurality of networks.

Further, as shown in FIG. 2, it is possible to calculate a second classification loss of the second image using the feature of the second image.

As an example, it is possible to calculate the second classification loss of the second image with a softmax loss function. Further, those skilled in the art can also envisage other manners to calculate the second classification loss of the second image, which will not be repeatedly described herein.

The similarity loss calculating unit 106 can be configured to calculate a similarity loss related to a similarity between the first classification probability and the second classification probability.

As stated above, the sample image and the second image corresponding thereto are images of the same entity, the second image may be an image generated after the sample image corresponding thereto is partially obstructed, the second image may be an image in a different posture as compared with the sample image corresponding thereto, the second image may be a fuzzy image of the sample image corresponding thereto, and the second image may be an image with lower resolution or worse image quality as compared with the sample image corresponding thereto, etc. To cause the recognition performance for the second image to be close to the recognition performance for the sample image corresponding to the second image, in the present disclosure, a similarity loss related to a similarity between the first classification probability obtained by the first machine learning framework and the second classification probability obtained by the second machine learning framework is defined, thereby making it possible to supervise and train the second machine learning framework by using a classification result of the first machine learning framework.

Preferably, the similarity loss is smaller if the similarity between the first classification probability and the second classification probability is higher, and the similarity loss is greater if the similarity between the first classification probability and the second classification probability is lower.

Specifically, for example, it is possible to calculate the similarity loss with a transfer loss function, and to update weight parameters of the first machine learning framework and the second machine learning framework by performing back propagation based on the similarity loss, so as to cause the second classification probability of the second image to be close to the first classification probability of the sample image corresponding to the second image as far as possible, such that the recognition performance for the second image is close to the recognition performance for the sample image corresponding to the second image as far as possible. The transfer loss function can, for example, be a cross entropy function, a KL divergence function, a maximum mean difference function and the like which are to be described below.

As shown in FIG. 2, the similarity loss is obtained based on the first classification probability outputted from the first classification probability calculation layer and the second classification probability outputted from the second classification probability calculation layer.

The total loss calculating unit 108 can be configured to calculate, for all sample images in the training set, the sum of the similarity loss, the first classification loss and the second classification loss obtained through calculation with respect to each sample image, as a total loss.

It is possible to represent the sum of first classification losses of all sample images in the training set as $L_F$, to represent the sum of second classification losses of all second images as $L_R$, and to represent the sum of similarity losses between all the sample images and the second images corresponding thereto as $L_S$.

Then, the total loss L can be represented as follows:

$$L = L_F + L_R + \lambda L_S \qquad (3)$$

In the equation (3), $\lambda$ is an adjustable parameter, which is used for balancing the classification losses (including the first classification loss and the second classification loss) and the similarity losses. As an example but not a limitation, those skilled in the art can set $\lambda$ according to experience.

As stated above, it is possible to calculate the similarity loss $L_S$ with a transfer loss function, and the transfer loss function can, for example, be a cross entropy function, a KL divergence function, a maximum mean difference function and the like. Specific representation forms of a KL divergence, a maximum mean value and a cross entropy between the first classification probability and the second classification probability will be given below, respectively.

The cross entropy $H(P_F, P_R)$ between the first classification probability $P_F$ and the second classification probability $P_R$ can be represented as follows:

$$H(P_F, P_R) = -\Sigma P_F * \log(P_R) \qquad (4)$$

In the equation (4), $\Sigma$ represents calculating, for all sample images in the training set, the sum of $P_F * \log(P_R)$ obtained through calculation for each sample image and a second image corresponding to the sample image.

A relative entropy may also be referred to as a KL divergence, for measuring a distance between the probability distributions $P_F$ and $P_R$.

$$D_{KL}(P_F \| P_R) = \Sigma P_F * \log(P_F / P_R) \qquad (5)$$

In the equation (5), $\Sigma$ represents calculating, for all sample images in the training set, the sum of $P_F * \log(P_F / P_R)$ obtained through calculation for each sample image and a second image corresponding to the sample image.

A relative entropy is an asymmetric distance, i.e., $D_{KL}(P_F \| P_R) \neq D_{KL}(P_R \| P_F)$.

The maximum mean difference (MMD) is used at a very high frequency in transfer learning, and it measures a distance between two distributions in a Reproducing Hilbert space and is a kernel learning method. A MMD square distance can be represented as follows:

$$MMD^2(P_F, P_R) = |\Sigma \Phi(P_F) - \Sigma \Phi(P_R)|^2 \qquad (6)$$

In the equation (6), $\Phi(\ )$ is a mapping function, for mapping $P_F$ and $P_R$ to a Reproducing Kernel Hilbert Space (RKHS) respectively, and $\Sigma$ represents performing processing on all sample images in the training set.

Preferably, before the similarity loss related to the similarity between the first classification probability and the second classification probability is calculated, a softening parameter causing information between different classes to be held is applied to the first classification probability and the second classification probability, respectively, to soften the first classification probability and the second classification probability.

As an example, in vector representation of the first classification probability, a probability value corresponding to a class of a label of the sample image is very great, while probability values corresponding to other classes are very small; therefore, a relationship between different classes is relatively weak. Therefore, it is possible to introduce a softening parameter $\tau$ to soften the first classification probability, so as to hold information between different classes as far as possible. Further, a softening parameter $\tau$ is also used to soften the second classification probability, so as to hold information between different classes as far as possible. After the same softening parameters $\tau$ are used, the first classification probability and the second classification probability which are outputted by the first calculation classification probability layer of the first convolutional neural network F-CNN and the second calculation classification probability layer of the second convolutional neural network R-CNN can be represented as follows, respectively:

$$P_F^\tau = \text{soft max}\left(\frac{a_F}{\tau}\right) \qquad (7)$$

$$P_R^\tau = \text{soft max}\left(\frac{a_R}{\tau}\right) \qquad (8)$$

It is possible to replace the $P_F$ and the $P_R$ in the equations (4) through (6) with the first classification probability and the second classification probability which are obtained through calculation in the equations (7) and (8), so as to calculate the KL divergence, and the maximum mean difference, the cross entropy between the first classification probability $P_F^\tau$; and the second classification probability $P_R^\tau$ respectively.

The training unit 110 can be configured to adjust parameters of the first machine learning framework and the second machine learning framework in a manner of optimizing the total loss, to obtain a trained classifying model.

As an example, the training unit 110 updates weight parameters of the first machine learning framework and the second machine learning framework by iteratively performing back propagation in a manner of optimizing the total loss. The manner of optimizing the total loss refers to causing the second classification probability of the second image to be close to the first classification probability of the sample image corresponding to the second image as far as possible and causing a classification result of the second image to be close to a real label of the sample image, such that the recognition performance for the second image is close to the recognition performance for the sample image corresponding to the second image as far as possible. The iteration ends when a predetermined condition is satisfied, so as to obtain a trained classifying model. The predetermined condition can be iterating for a predetermined number of times, the total loss being less than a predetermined value, etc.

Preferably, the sample image is an unobstructed image, and the second image is an image obtained by performing predetermined processing on the sample image. As examples, the sample image may be an unobstructed vehicle license plate image, an unobstructed human face image, an unobstructed character image, etc. As an example but not a limitation, the predetermined processing may include performing obstruction processing on the sample image, performing random fuzzy processing on the sample image, etc.

Preferably, the sample image is a face image of a human, and the second image is an image including eyes which is obtained by performing predetermined processing on the sample image.

In the case where the sample image is a face image of a human, images of eyes play a very important role in human face recognition. The second image including eyes can improve the recognition performance for the second image.

As an example, it is possible to detect, by a human face key point detection algorithm, 5 key point positions (positions of both eyes, a nose, and both mouth corners) of the human face in the sample image. Then, by randomly adding partial obstruction on the human face in the sample image according to the 5 key points, it is possible to obtain the second image.

Preferably, the second image is an obstructed image obtained by obstructing forehead hair in the sample image. As shown in FIG. 2, the second image in FIG. 2 is obtained by obstructing forehead hair in the sample image.

As an example, by randomly adding obstruction on the forehead hair portion of the human face in the sample image according to the 5 key points, it is possible to obtain the second image.

Preferably, the second image is an image obtained by removing glasses in the sample image.

Preferably, the second image is an image obtained by performing random fuzzy processing on the sample image.

Preferably, the sample image is a front image of a face of a human, and the second image is obtained by performing predetermined processing on images of different postures of a human to which the sample image belongs.

Preferably, the second image is obtained by performing affine transformation on the images of different postures.

To sum up, the apparatus 100 for training a classifying model according to the embodiment of the present disclosure causes the second classification probability of the second image to be close to the first classification probability of the sample image corresponding to the second image as far as possible and causes a classification result of the second image to be close to a real label of the sample image, such that the recognition performance for the second image is close to the recognition performance for the sample image, thereby obtaining a training model with high robustness. As an example, upon occurrence of an image being occluded (e.g., a face image being obstructed by forehead hair, etc.), an image being in a different posture, image fuzzy, low resolution and poor image quality in an application scenario, by performing recognition on these images with the trained classifying model obtained by the apparatus 100 for training a classifying model according to the embodiment of the present disclosure, it is possible to improve the recognition performance for these images, so as to improve the classification accuracy of these images.

In correspondence to the above-mentioned embodiment of the apparatus for training a classifying model, the present disclosure further provides the following embodiment of a method for training a classifying model.

Figure 3:
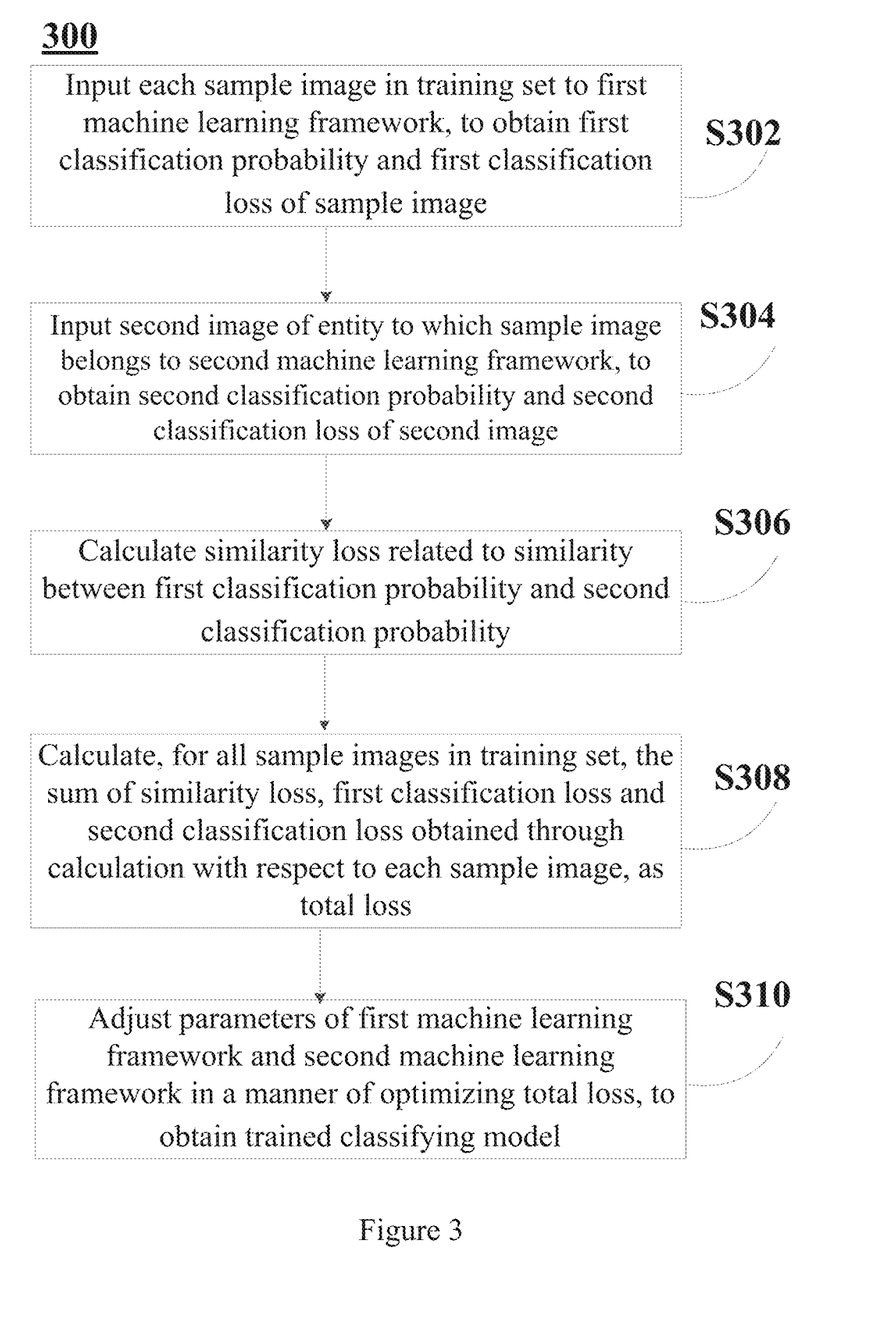
FIG. 3 is a flowchart showing a flowchart example of a method for training a classifying model according to an embodiment of the present disclosure.

FIG. 3 is a flowchart showing a flowchart example of a method 300 for training a classifying model according to an embodiment of the present disclosure.

As shown in FIG. 3, the method 300 for training a classifying model according to the embodiment of the present disclosure comprises a first obtaining step S302, a second obtaining step S304, a similarity loss calculating step S306, a total loss calculating step S308, and a training step S310.

In the first obtaining step S302, each sample image in a training set is input to a first machine learning framework, to obtain a first classification probability and a first classification loss of the sample image.

Specifically, in the first obtaining step S302, each sample image in a training set is inputted to a first machine learning framework, to obtain a feature of each sample image. Then, a first classification probability and a first classification loss of the sample image are calculated based on the feature of the sample image.

As an example, the first machine learning framework may comprise a first classification probability calculation layer, which is used for calculating the first classification probability of the sample image based on the feature of the sample image.

As an example but not a limitation, the first machine learning framework may be a neural network framework. Those skilled in the art can understand that, the first machine learning framework may be a framework other than the neural network framework, which will not be repeatedly described herein.

As an example, it is possible to calculate the first classification loss of the sample image with a softmax loss function. Further, those skilled in the art can also envisage other manners to calculate the first classification loss of the sample image, which will not be repeatedly described herein.

In the second obtaining step S304, a second image of an entity to which the sample image belongs is input to a second machine learning framework, to obtain a second classification probability and a second classification loss of the second image, wherein the first machine learning framework and the second machine learning framework have identical structures and share identical parameters.

As examples, in a case where the sample image is a vehicle license plate image, an entity to which the sample image belongs is a vehicle license plate, and accordingly, a second image of the entity to which the sample image belongs is also an image of the vehicle license plate, that is, the sample image and the second image are images of the same vehicle license plate; in a case where the sample image is a human face image, an entity to which the sample image belongs is a human face, and accordingly, a second image of the entity to which the sample image belongs is also an image of the human face, that is, the sample image and the second image are images of the same human face; in a case where the sample image is a character image, an entity to which the sample image belongs is a character, and accordingly, a second image of the entity to which the sample image belongs is also an image of the character, that is, the sample image and the second image are images of the same character; those skilled in the art can also envisage other examples of the sample image and the second image corresponding thereto, which will not be repeatedly described herein.

As an example but not a limitation, the second image may be an image generated after the sample image corresponding thereto is partially obstructed, the second image may be an image in a different posture as compared with the sample image corresponding thereto, the second image may be a fuzzy image of the sample image corresponding thereto, and the second image may be an image with lower resolution or worse image quality as compared with the sample image corresponding thereto.

Specifically, in the second obtaining step S304, a second image of an entity to which the sample image inputted to the first machine learning framework belongs is inputted to a second machine learning framework, to obtain a feature of the second image. Then, a second classification probability and a second classification loss of the second image are calculated based on the feature of the second image.

As an example, the second machine learning framework may comprise a second classification probability calculation layer, which is used for calculating the second classification probability of the second image based on the feature of the second image.

As an example but not a limitation, the second machine learning framework may be a neural network framework. Those skilled in the art can understand that, the second machine learning framework may be a framework other than the neural network framework, which will not be repeatedly described herein.

As an example, it is possible to calculate the second classification loss of the second image with a softmax loss function. Further, those skilled in the art can also envisage other manners to calculate the second classification loss of the second image, which will not be repeatedly described herein.

In the similarity loss calculating step S306, it is possible to calculate a similarity loss related to a similarity between the first classification probability and the second classification probability.

By the similarity loss related to the similarity between the first classification probability and the second classification probability, it is possible to supervise and train the second machine learning framework by using a classification result of the first machine learning framework.

Preferably, the similarity loss is smaller if the similarity between the first classification probability and the second classification probability is higher, and the similarity loss is greater if the similarity between the first classification probability and the second classification probability is lower.

Specifically, for example, it is possible to calculate the similarity loss with a transfer loss function, and to update weight parameters of the first machine learning framework and the second machine learning framework by performing back propagation based on the similarity loss, so as to cause the second classification probability of the second image to be close to the first classification probability of the sample image corresponding to the second image as far as possible, such that the recognition performance for the second image is close to the recognition performance for the sample image corresponding to the second image as far as possible. The transfer loss function can, for example, be a cross entropy function, a KL divergence function, a maximum mean difference function and the like.

In the total loss calculating step S308, it is possible to calculate, for all sample images in the training set, the sum of the similarity loss, the first classification loss and the second classification loss obtained through calculation with respect to each sample image, as a total loss.

In the training step S310, parameters of the first machine learning framework and the second machine learning framework are adjusted in a manner of optimizing the total loss, to obtain a trained classifying model.

As an example, in the training step S310, weight parameters of the first machine learning framework and the second machine learning framework are updated by iteratively performing back propagation in a manner of optimizing the total loss, to cause the second classification probability of the second image to be close to the first classification probability of the sample image corresponding to the second image as far as possible and cause a classification result of the second image to be close to a real label of the sample image, such that the recognition performance for the second image is close to the recognition performance for the sample image corresponding to the second image as far as possible. The iteration ends when a predetermined condition is satisfied, so as to obtain a trained classifying model. The predetermined condition can be iterating for a predetermined number of times, the total loss being less than a predetermined value, etc.

Preferably, the sample image is an unobstructed image, and the second image is an image obtained by performing predetermined processing on the sample image. As examples, the sample image may be an unobstructed vehicle license plate image, an unobstructed human face image, an unobstructed character image, etc. As an example but not a limitation, the predetermined processing may include performing obstruction processing on the sample image, performing random fuzzy processing on the sample image, etc.

Preferably, the sample image is a face image of a human, and the second image is an image including eyes which is obtained by performing predetermined processing on the sample image.

In the case where the sample image is a face image of a human, images of eyes play a very important role in human face recognition. The second image including eyes can improve the recognition performance for the second image.

Preferably, the second image is an obstructed image obtained by obstructing forehead hair in the sample image.

Preferably, the second image is an image obtained by removing glasses in the sample image.

Preferably, the second image is an image obtained by performing random fuzzy processing on the sample image.

Preferably, the sample image is a front image of a face of a human, and the second image is obtained by performing predetermined processing on images of different postures of a human to which the sample image belongs.

Preferably, the second image is obtained by performing affine transformation on the images of different postures.

To sum up, the method 300 for training a classifying model according to the embodiment of the present disclosure causes the second classification probability of the second image to be close to the first classification probability of the sample image corresponding to the second image as far as possible and causes a classification result of the second image to be close to a real label of the sample image, such that the recognition performance for the second image is close to the recognition performance for the sample image, thereby obtaining a training model with high robustness. As an example, upon occurrence of an image being occluded (e.g., a face image being obstructed by forehead hair, etc.), an image being in a different posture, image fuzzy, low resolution and poor image quality in an application scenario, by performing recognition on these images with the trained classifying model obtained by the method 300 for training a classifying model according to the embodiment of the present disclosure, it is possible to improve the recognition performance for these images, so as to improve the classification accuracy of these images.

The present disclosure further provides an apparatus for performing classification by using the trained classifying model obtained by the above-mentioned apparatus 100 for training a classifying model, the apparatus comprising: a classifying unit configured to classify images to be classified by inputting the images to be classified to the first machine learning framework or the second machine learning framework.

As stated in the description of the apparatus 100 for training a classifying model, the first machine learning framework and the second machine learning framework have identical structures and share identical parameters. Therefore, in the classifying unit, it is only necessary to input images to be classified to the first machine learning framework or the second machine learning framework in order to classify the images to be classified.

As an example, in a case where the first machine learning framework or the second machine learning framework is a convolutional neural network, it is possible to classify images to be classified, by inputting the images to be classified to the trained convolutional neural network.

The trained classifying model has high robustness; thus, as an example, upon occurrence of an image being occluded (e.g., a face image being obstructed by forehead hair, etc.), an image being in a different posture, image fuzzy, low resolution and poor image quality in an application scenario, by performing recognition on these images with the above-mentioned trained classifying model, it is possible to improve the recognition performance for these images, so as to improve the classification accuracy of these images.

In correspondence to the above-mentioned embodiment of the apparatus for performing classification with a trained classifying model, the present disclosure further provides the following embodiment of a method for performing classification with a trained classifying model. The method comprises a classifying step, in which images to be classified are inputted to the first machine learning framework or the second machine learning framework to classify the images to be classified.

As an example, in a case where the first machine learning framework or the second machine learning framework is a convolutional neural network, it is possible to classify images to be classified, by inputting the images to be classified to the trained convolutional neural network.

The trained classifying model has high robustness; thus, as an example, upon occurrence of an image being occluded (e.g., a face image being obstructed by forehead hair, etc.), an image being in a different posture, image fuzzy, low resolution and poor image quality in an application scenario, by performing recognition on these images with the above-mentioned trained classifying model, it is possible to improve the recognition performance for these images, so as to improve the classification accuracy of these images.

It should be noted that, although the functional configurations and the operations of the apparatus and method for training a classifying model, as well as the apparatus and method for performing classification by using the trained classifying model according to the embodiments of the present disclosure have been described above, this is only exemplary but not limiting, and those skilled in the art may carry out modifications on the above embodiments, for example may carry out additions, deletions or combinations the like on the functional modules and the operations in each embodiment, according to the principle of the present disclosure. Moreover, all of such modifications fall within the scope of the present disclosure.

Further, it should also be noted that, the method embodiment herein corresponds to the above-mentioned apparatus embodiment. Thus, for contents not described in detail in the method embodiment, reference may be made to the corresponding description in the apparatus embodiment, and repeated description will not be made herein.

Further, the present application further provides a storage medium and a product program. Machine executable instructions in the storage medium and the program product according to the embodiments of the present disclosure can be configured to implement the above-mentioned method. Thus, for contents not described in detail herein, reference may be made to the foregoing corresponding description, and repeated description will not be made herein.

Accordingly, a storage medium for carrying the above-mentioned program product comprising machine executable instructions is also included in the disclosure of the present invention. The storage medium includes, but is not limited to, a floppy disc, an optical disc, a magnetic optical disc, a memory card, a memory stick and the like.

Figure 4:
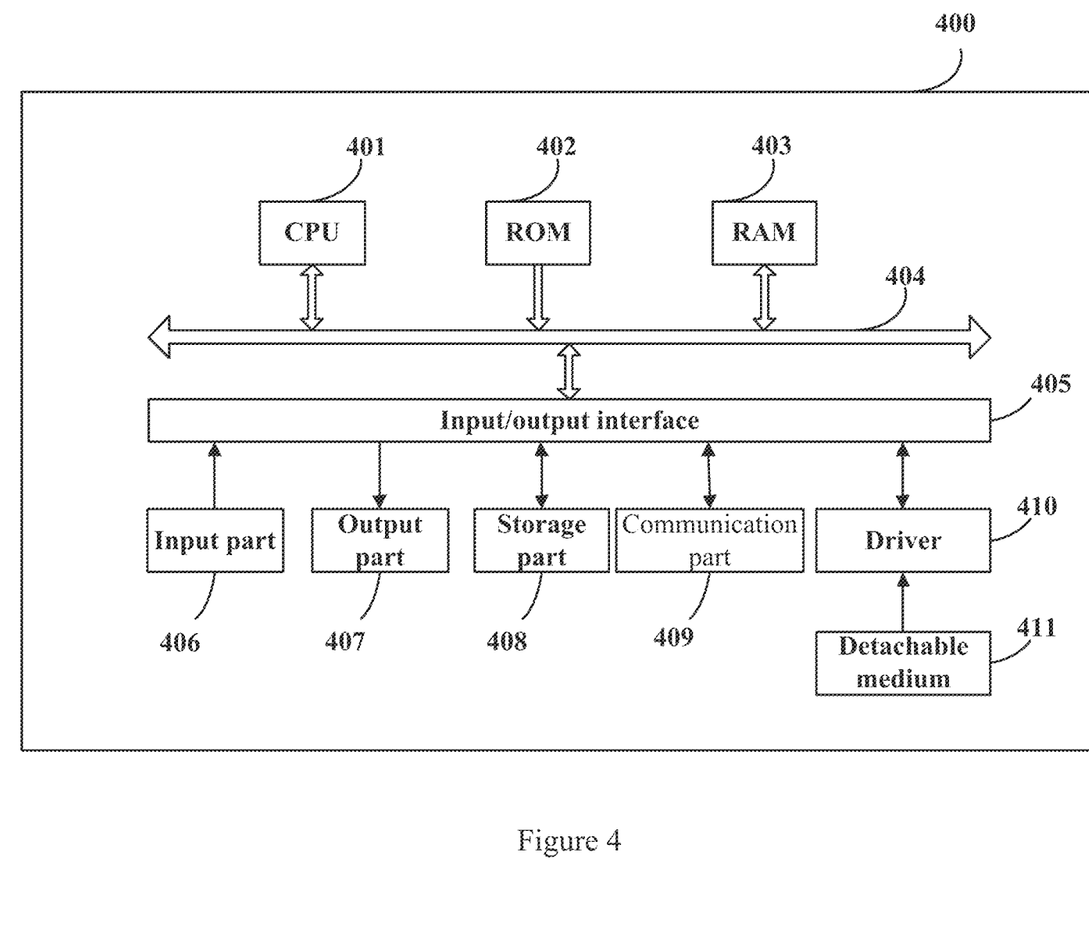
FIG. 4 is a block diagram showing an exemplary structure of a personal computer that can be used in the embodiments of the present disclosure.

In addition, it should also be noted that, the above series of processing and apparatuses may also be implemented by software and/or firmware. In the case of implementation by software and/or firmware, programs constituting the software are installed from a storage medium or a network to a computer having a dedicated hardware structure, for example the universal personal computer 400 as shown in FIG. 4. The computer, when installed with various programs, can execute various functions and the like.

In FIG. 4, a Central Processing Unit (CPU) 401 executes various processing according to programs stored in a Read-Only Memory (ROM) 402 or programs loaded from a storage part 408 to a Random Access Memory (RAM) 403. In the RAM 403, data needed when the CPU 401 executes various processing and the like is also stored according to requirements.

The CPU 401, the ROM 402 and the RAM 403 are connected to each other via a bus 404. An input/output interface 405 is also connected to the bus 404.

The following components are connected to the input/output interface 405: an input part 406, including a keyboard, a mouse and the like; an output part 407, including a display, such as a Cathode Ray Tube (CRT), a Liquid Crystal Display (LCD) and the like, as well as a speaker and the like; the storage part 408, including a hard disc and the like; and a communication part 409, including a network interface card such as an LAN card, a modem and the like. The communication part 409 executes communication processing via a network such as the Internet.

According to requirements, a driver 410 is also connected to the input/output interface 405. A detachable medium 411 such as a magnetic disc, an optical disc, a magnetic optical disc, a semiconductor memory and the like is installed on the driver 410 according to requirements, such that computer programs read therefrom are installed in the storage part 308 according to requirements.

In a case where the foregoing series of processing is implemented by software, programs constituting the software are installed from a network such as the Internet or a storage medium such as the detachable medium 411.

Those skilled in the art should understand that, such a storage medium is not limited to the detachable medium 411 in which programs are stored and which are distributed separately from an apparatus to provide the programs to users as shown in FIG. 4. Examples of the detachable medium 411 include a magnetic disc (including a floppy disc (registered trademark)), a compact disc (including a Compact Disc Read-Only Memory (CD-ROM) and a Digital Versatile Disc (DVD), a magneto optical disc (including a Mini Disc (MD) (registered trademark)), and a semiconductor memory. Or, the memory medium may be hard discs included in the ROM 402 and the memory part 408, in which programs are stored and which are distributed together with the apparatus containing them to users.

Preferred embodiments of the present disclosure have been described above with reference to the drawings. However, the present disclosure of course is not limited to the foregoing examples. Those skilled in the art can obtain various alterations and modifications within the scope of the appended claims, and it should be understood that these alterations and modifications naturally will fall within the technical scope of the present disclosure.

For example, in the foregoing embodiments, a plurality of functions incorporated in one unit may be implemented by separate apparatuses. Alternatively, in the foregoing embodiments, a plurality of functions implemented by a plurality of units may be implemented by separate apparatuses, respectively. In addition, one of the above functions may be implemented by a plurality of units. Undoubtedly, such configurations are included within the technical scope of the present disclosure.

In the specification, the steps described in the flowchart not only include processing executed in the order according to a time sequence but also include processing executed in parallel or separately but not necessarily according to a time sequence. In addition, even if in steps in which processing is executed according to a time sequence, the order undoubtedly still can be appropriately changed.

In addition, the technology of the present disclosure may also perform configurations as follows.

Appendix 1. An apparatus for training a classifying model, comprising:

a first obtaining unit configured to input each sample image in a training set to a first machine learning framework, to obtain a first classification probability and a first classification loss of the sample image;

a second obtaining unit configured to input a second image of an entity to which the sample image belongs to a second machine learning framework, to obtain a second classification probability and a second classification loss of the second image, wherein the first machine learning framework and the second machine learning framework have identical structures and share identical parameters;

a similarity loss calculating unit configured to calculate a similarity loss related to a similarity between the first classification probability and the second classification probability;

a total loss calculating unit configured to calculate, for all sample images in the training set, the sum of the similarity loss, the first classification loss and the second classification loss obtained through calculation with respect to each sample image, as a total loss; and a training unit configured to adjust parameters of the first machine learning framework and the second machine learning framework in a manner of optimizing the total loss, to obtain a trained classifying model.

Appendix 2. The apparatus for training a classifying model according to Appendix 1, wherein the similarity loss is smaller if the similarity between the first classification probability and the second classification probability is higher, and the similarity loss is greater if the similarity between the first classification probability and the second classification probability is lower.

Appendix 3. The apparatus for training a classifying model according to Appendix 1, wherein the sample image is an unobstructed image, and the second image is an image obtained by performing predetermined processing on the sample image.

Appendix 4: The apparatus for training a classifying model according to Appendix 3, wherein the sample image is a face image of a human, and the second image is an image including eyes which is obtained by performing predetermined processing on the sample image.

Appendix 5: The apparatus for training a classifying model according to Appendix 4, wherein the second image is an obstructed image obtained by obstructing forehead hair in the sample image, or the second image is an image obtained by removing glasses in the sample image.

Appendix 6: The apparatus for training a classifying model according to Appendix 3, wherein the second image is an image obtained by performing random fuzzy processing on the sample image.

Appendix 7: The apparatus for training a classifying model according to Appendix 1, wherein the sample image is a front image of a face of a human, and the second image is obtained by performing predetermined processing on images of different postures of a human to which the sample image belongs.

Appendix 8: The apparatus for training a classifying model according to Appendix 7, wherein the second image is obtained by performing affine transformation on the images of different postures.

Appendix 9: The apparatus for training a classifying model according to Appendix 1, wherein the similarity loss is calculated using a transfer loss function between the first classification probability and the second classification probability, the transfer loss function comprising one of a cross entropy function, a KL divergence function and a maximum mean difference function.

Appendix 10: The apparatus for training a classifying model according to Appendix 1, wherein before the similarity loss related to the similarity between the first classification probability and the second classification probability is calculated, a softening parameter causing information between different classes to be held is applied to the first classification probability and the second classification probability, respectively, to soften the first classification probability and the second classification probability.

Appendix 11: A method for training a classifying model, comprising:

a first obtaining step of inputting each sample image in a training set to a first machine learning framework, to obtain a first classification probability and a first classification loss of the sample image;

a second obtaining step of inputting a second image of an entity to which the sample image belongs to a second machine learning framework, to obtain a second classification probability and a second classification loss of the second image, wherein the first machine learning framework and the second machine learning framework have identical structures and share identical parameters;

a similarity loss calculating step of calculating a similarity loss related to a similarity between the first classification probability and the second classification probability;

a total loss calculating step of calculating, for all sample images in the training set, the sum of the similarity loss, the first classification loss and the second classification loss obtained through calculation with respect to each sample image, as a total loss; and a training step of adjusting parameters of the first machine learning framework and the second machine learning framework in a manner of optimizing the total loss, to obtain a trained classifying model.

Appendix 12. The method for training a classifying model according to Appendix 11, wherein the similarity loss is smaller if the similarity between the first classification probability and the second classification probability is higher, and the similarity loss is greater if the similarity between the first classification probability and the second classification probability is lower.

Appendix 13. The method for training a classifying model according to Appendix 11, wherein the sample image is an unobstructed image, and the second image is an image obtained by performing predetermined processing on the sample image.

Appendix 14. The method for training a classifying model according to Appendix 13, wherein the sample image is a face image of a human, and the second image is an image including eyes which is obtained by performing predetermined processing on the sample image.

Appendix 15. The method for training a classifying model according to Appendix 14, wherein the second image is an obstructed image obtained by obstructing forehead hair in the sample image, or the second image is an image obtained by removing glasses in the sample image.

Appendix 16. The method for training a classifying model according to Appendix 13, wherein the second image is an image obtained by performing random fuzzy processing on the sample image.

Appendix 17. The method for training a classifying model according to Appendix 11, wherein the sample image is a front image of a face of a human, and the second image is obtained by performing predetermined processing on images of different postures of a human to which the sample image belongs.

Appendix 18. The method for training a classifying model according to Appendix 17, wherein the second image is obtained by performing affine transformation on the images of different postures.

Appendix 19. The method for training a classifying model according to Appendix 11, wherein the similarity loss is calculated using a transfer loss function between the first classification probability and the second classification probability, the transfer loss function comprising one of a cross entropy function, a KL divergence function and a maximum mean difference function.

Appendix 20. An apparatus for performing classification by using the trained classifying model obtained by the apparatus for training a classifying model according to any one of Appendixes 1 to 10, comprising:

a classifying unit configured to classify images to be classified by inputting the images to be classified to the first machine learning framework or the second machine learning framework.

The invention claimed is:

1. An apparatus for training a classifying model, comprising:

a memory; and a processor coupled to the memory, wherein the processor is configured to:

input each sample image in a training set to a first machine learning framework, to obtain a first classification probability and a first classification loss of the sample image;

input a second image of an entity, to which the sample image belongs, to a second machine learning framework to obtain a second classification probability and a second classification loss of the second image, wherein the first machine learning framework and the second machine learning framework have identical structures and share identical parameters, and wherein the sample image and the second image corresponding to the sample image belong to a same class;

calculate a similarity loss related to a similarity between the first classification probability and the second classification probability;

calculate, for all sample images in the training set, the sum of the similarity loss, the first classification loss and the second classification loss obtained through calculation with respect to each sample image, as a total loss; and adjust parameters of the first machine learning framework and the second machine learning framework in a manner of optimizing the total loss, to obtain a trained classifying model.

2. The apparatus for training a classifying model according to claim 1, wherein the similarity loss is smaller if the similarity between the first classification probability and the second classification probability is higher, and the similarity loss is greater if the similarity between the first classification probability and the second classification probability is lower.

3. The apparatus for training a classifying model according to claim 1, wherein the sample image is an unobstructed image, and the second image is an image obtained by performing predetermined processing on the sample image.

4. The apparatus for training a classifying model according to claim 3, wherein the sample image is a face image of a human, and the second image is an image including eyes which is obtained by performing predetermined processing on the sample image.

5. The apparatus for training a classifying model according to claim 4, wherein the second image is an obstructed image obtained by obstructing forehead hair in the sample image, or the second image is an image obtained by removing glasses in the sample image.

6. The apparatus for training a classifying model according to claim 3, wherein the second image is an image obtained by performing random fuzzy processing on the sample image.

7. The apparatus for training a classifying model according to claim 1, wherein the sample image is a front image of a face of a human and the second image is obtained by performing predetermined processing on images of different postures of a human to which the sample image belongs.

8. The apparatus for training a classifying model according to claim 7, wherein the second image is obtained by performing affine transformation on the images of different postures.

9. The apparatus for training a classifying model according to claim 1, wherein the similarity loss is calculated using a transfer loss function between the first classification probability and the second classification probability, the transfer loss function comprising one of a cross entropy function, a KL divergence function and a maximum mean difference function.

10. The apparatus for training a classifying model according to claim 1, wherein before the similarity loss related to the similarity between the first classification probability and the second classification probability is calculated, a softening parameter causing information between different classes to be held is applied to the first classification probability and the second classification probability, respectively, to soften the first classification probability and the second classification probability.

11. An apparatus for performing classification by using the trained classifying model obtained by the apparatus for training the classifying model according to claim 1, comprising:
a memory; and
a processor coupled to the memory, wherein the processor is configured to classify images to be classified by inputting the images to be classified to the first machine learning framework or the second machine learning framework.

12. A method for training a classifying model, comprising:
inputting each sample image in a training set to a first machine learning framework, to obtain a first classification probability and a first classification loss of the sample image;
inputting a second image of an entity, to which the sample image belongs, to a second machine learning framework to obtain a second classification probability and a second classification loss of the second image, wherein the first machine learning framework and the second machine learning framework have identical structures and share identical parameters, and wherein the sample image and the second image corresponding to the sample image belong to a same class;
calculating a similarity loss related to a similarity between the first classification probability and the second classification probability;
calculating, for all sample images in the training set, the sum of the similarity loss, the first classification loss and the second classification loss obtained through calculation with respect to each sample image, as a total loss; and
adjusting parameters of the first machine learning framework and the second machine learning framework in a manner of optimizing the total loss, to obtain a trained classifying model.

13. The method for training a classifying model according to claim 12, wherein the similarity loss is smaller if the similarity between the first classification probability and the second classification probability is higher, and the similarity loss is greater if the similarity between the first classification probability and the second classification probability is lower.

14. The method for training a classifying model according to claim 12, wherein the sample image is an unobstructed image, and the second image is an image obtained by performing predetermined processing on the sample image.

15. The method for training a classifying model according to claim 14, wherein the sample image is a face image of a human, and the second image is an image including eyes which is obtained by performing predetermined processing on the sample image.

16. The method for training a classifying model according to claim 15, wherein the second image is an obstructed image obtained by obstructing forehead hair in the sample image, or the second image is an image obtained by removing glasses in the sample image.

17. The method for training a classifying model according to claim 14, wherein the second image is an image obtained by performing random fuzzy processing on the sample image.

18. The method for training a classifying model according to claim 12, wherein the sample image is a front image of a face of a human, and the second image is obtained by performing predetermined processing on images of different postures of a human to which the sample image belongs.

19. The method for training a classifying model according to claim 18, wherein the second image is obtained by performing affine transformation on the images of different postures.

20. The method for training a classifying model according to claim 12, wherein the similarity loss is calculated using a transfer loss function between the first classification probability and the second classification probability, the transfer loss function comprising one of a cross entropy function, a KL divergence function and a maximum mean difference function.

* * * * *